United States Patent
Winter et al.

(10) Patent No.: US 8,608,892 B2
(45) Date of Patent: Dec. 17, 2013

(54) METHOD FOR MAKING A COLOR DISPLAY DEVICE

(75) Inventors: Steven B. Winter, Highland Park, IL (US); Stanley I. Lerner, Glencoe, IL (US)

(73) Assignee: Color Communications, Inc., Chicago, IL (US)

( * ) Notice: Subject to any disclaimer, the term of this patent is extended or adjusted under 35 U.S.C. 154(b) by 1524 days.

(21) Appl. No.: 11/316,077

(22) Filed: Dec. 22, 2005

(65) Prior Publication Data

US 2007/0144664 A1    Jun. 28, 2007

(51) Int. Cl.
*B32B 37/00* (2006.01)
*B32B 37/02* (2006.01)
*B32B 37/14* (2006.01)
*B32B 38/00* (2006.01)
*B32B 38/04* (2006.01)

(52) U.S. Cl.
USPC ............ 156/256; 156/250; 156/252; 156/253

(58) Field of Classification Search
USPC .......... 156/250, 277; 264/510; 427/421, 355, 427/58, 162, 372.2, 421.1; 428/40.1; 118/118, 126, 413, 414
See application file for complete search history.

(56) References Cited

U.S. PATENT DOCUMENTS

| | | | |
|---|---|---|---|
| 4,379,696 A | 4/1983 | Lerner | |
| 4,457,718 A | 7/1984 | Lerner | |
| 4,921,755 A * | 5/1990 | Carroll et al. | 428/328 |
| 6,113,838 A * | 9/2000 | Flynn et al. | 264/510 |
| 6,214,112 B1 * | 4/2001 | Plomer | 118/249 |
| 2002/0122892 A1 * | 9/2002 | Dattilo | 427/421 |
| 2003/0072907 A1 * | 4/2003 | Lerner et al. | 428/40.1 |
| 2004/0013806 A1 * | 1/2004 | Kiiha et al. | 427/355 |

* cited by examiner

*Primary Examiner* — Philip Tucker
*Assistant Examiner* — Christopher C Caillouet
(74) *Attorney, Agent, or Firm* — Fitch, Even, Tabin & Flannery LLP

(57) ABSTRACT

A method of making a color display device and color display device are provided for the display of metallic or special effect pigmented paint using commercially available or the manufacturer's paint. In the method provided herein, the metallic or special effect pigmented paint is sprayed onto a web behind a knife or onto a first roller which is a part of a roller roller coater.

36 Claims, 3 Drawing Sheets

METHOD FOR MAKING A COLOR DISPLAY DEVICE

FIELD

The present invention relates to color display devices and making color display devices for paint products. More particularly, the present invention relates to making color display devices or color cards which display metallic paint where the method includes spraying the paint onto a polymeric web traveling over a roller and under a knife. Alternatively the paint may be sprayed onto a roller roller coater for application to a polymeric web. The painted web then is cut into swatches or paint chips which chips then are adhesively affixed to a mount base. The present invention also relates to color display devices made by such method.

BACKGROUND

Paint colors often are displayed on color swatches mounted on flat planar bases for the display of color. Displaying the true color of paint has been a problem and has created an expense of labor and materials. For example, most color cards are not painted with the actual paint sold to the consumer who is selecting the paint and its color. Instead, the color card manufacturer makes a special coating composition which then is color matched to the paint being sold to the consumer by the paint manufacturer. Typically, use of a manufacturer's paint would cause blocking. Blocking causes the surface of the paint on a paint coated chip to stick to materials over laid onto the surface of the paint. Formulating a color matched special paint for color cards creates costs for preparation of the special coating composition, plus costs caused by the necessity of color matching the special coating composition with the actual paint being made by the paint manufacturer and sold to the consumer.

Those who apply metallic or special effects paint, such as automobile manufacturers, often spray metallic paint onto a substrate. These users of metallic and glossy paint have marketing concerns about their color cards including how paint is applied to the chip or swatch to render the appearance of a paint coating on the paint chip identical to the paint on a substrate such as an automobile. To address such concerns, some manufactures of color cards have sprayed paint onto a paper base and then applied clear coat over the paint coatings. This method apparently has required multiple paint coats, such as three or even more paint coats, plus an additional clear coat. This method is expensive by virtue of labor and materials.

Using a spray to apply metallic paint, if it could be done efficiently, would provide significant advantages to a color card maker and paint manufacturer. First, it would provide an opportunity to use the customers paint and reduce color matching problems. Using the customer's paint also would reduce formulation costs for the special coating compositions which historically have been used by color card manufacturers. But if the metallic paint is sprayed, heretofore large amounts of paint have been lost to atomization of the paint into the atmosphere. Moreover if possible, the number of coats of paint used should be reduced to use less paint and make the process more economical.

Knife over roll coaters and roller roller coaters have been used by color card manufacturers to apply pigmented coatings to a web for later use in the manufacture of color display devices. As seen in FIG. 1, with knife over roll coaters, the liquid pigmented coating is applied onto a web upstream of a knife. The knife spreads and thins the liquid pigmented coating onto the web. In a roller roller coater, the liquid pigmented coating is spread on a roller, which then applies the liquid pigmented coating onto the surface of a second roller, or series of rollers, the last of which applies the liquid pigmented coating to a web. As seen in FIG. 2, with roller roller coaters, a pigmented coating is applied to a first roller which spreads and applies liquid pigmented material to one or more downstream rollers, the last of which applies a pigmented coating to a web.

As can be seen by reference to U.S. Pat. Nos. 4,379,696, and 4,457,718 and United States Patent Application Publication US 2003/0072907, now allowed, color card manufacturers also have coated films, such as polyethylene terephthalate and polypropylene, with liquid pigmented coatings to manufacture color cards. These operations, however, did not address the problem of the spray application of metallic or special effects pigmented paint, or the use of a spray in connection with the application of the metallic paint. Nor did the methods described in these patents address the problem of economically using a spray painting technique to make color display products such as color cards.

SUMMARY

A method of making a color display device and color display device are provided for the display of metallic and special effect pigmented paint using commercially available or the manufacturer's paint. The need for formulating a special pigmented paint for color cards or color display devices is eliminated by the method described herein; hence, the need for color matching the specially formulated paint with a manufacturer's paint is minimized. The color rendition provided by the new color display device and method described herein provide a more precise color emulation of the color of a manufacturer's metallic or other types of special effect pigmented paint. Further, spraying the metallic or special effect pigmented paint as described herein achieves a more efficient and cost effective application of a paint manufacturer's metallic or special effect pigmented paint than by just spraying the paint onto the surface of a web which web subsequently will be cut into paint coated swatches or chips which then will be applied to a mount base. Additionally, spraying a metallic or special effect pigmented paint onto a web or roller, as described herein, provides a product having a more precise emulation of the metallic or special effect pigmented paint which has been spray applied and used by an actual end user of the paint manufacturer's paint, as compared to a color display product where the metallic or special effect pigmented paint has been applied by a knife over roll coater or a roller roller coater, but which has not been sprayed onto the web or roller.

In the method provided herein, the metallic or special effect pigmented paint is sprayed onto a thin polymeric web traveling over a roller which is a part of a knife over roll coater. Alternatively paint is sprayed onto a roller of a roller roller coater. The knife of the knife over roll coater is above and spaced from the web and roller under the web. The metallic or special effect pigmented paint is sprayed behind the knife onto the web. As the roller under the knife rolls it moves the web downstream with the knife spreading the paint onto the web. The spraying forms a small reservoir of paint behind the knife which permits the knife to spread the paint as the roller rolls under the web urges the web under the knife. Alternatively, paint is sprayed onto a first roller of a roller roller coater which is in rolling contact with a second roller. The first roller having the paint sprayed thereon, applies the paint to at least one or more rollers downstream the first roller. The second roller is in rolling contact with the first roller. A second or even another roller in rolling contact with the second roller applies the sprayed paint onto the polymeric film. The applied paint is dried.

The metallic or special effect pigmented paint is applied with a low pressure spray gun at an air cap pressure (measuring exiting pressure at the cap on the nozzle) in the range of from about 2 psi to about 10 psi. Spray gun tip sizes range from about 0.7 mm to 2.2 mm in diameter. The spray nozzle is from about 7 cm to about 39 centimeters from the surface of the roller to which paint is being applied. Paint is spray applied to the web at the rate of from about 8 fluid ounces to about 20 fluid ounces/minute. The polymeric web moves under the paint application knife at from 5 to about 100 lineal feet/minute. The roller under the knife may be about 9 inches in diameter, The metallic or special effect pigmented paint being applied can be water or organic solvent based paint, but preferably is water based because volatile organic emissions will cease to be a problem. Metallic paint is a paint that contains metal flakes as a part of its pigment system. A special effect pigmented paint can include metallic flakes, but also may include other types of flakes such as glass, mica coated with a color coating or liquid crystals. These paints have an appearance which varies depending upon the angle at which the paint is viewed when the paint is dried. In general a metallic or special effect pigmented paint contains from about 1 to about 10 weight percent flakes which generally range in size from about 1 to about 100 microns. An important aspect of this invention is, however, the application of metallic paint which includes metallic flakes by spraying the metallic paint onto a web in a knife over roll coater or system of rollers for application of the paint to a polymer film web.

In an important aspect the thin film is clear acrylic coated biaxially oriented polypropylene or clear polyethylene terephthalate film. The paint coated film is applied to adhesive on the mount base with the paint on the film interfacing with the adhesive. In this aspect the paint is viewed through the clear film. The film has a gloss which emulates a clear coated surface and blocking avoided because paint is not on top of the film facing away from the mount base.

After application of the paint to the web, the painted web is cut into painted chips or larger swatches which are adhesively applied to a mount base which may be paper. The swatches may form a color fan deck having blades comprising the painted polymeric film swatches mounted on a planar base, such as a paper base, or a plurality of chips or swatches on a mount base forming a paint color chip display card. In an important aspect, the swatches are applied to adhesive which has been printed onto the mount base. Printing the adhesive onto the mount base because printing provides precise control for the placement of the adhesive and swatch onto the mount base.

DETAILED DESCRIPTION

Figure 1:
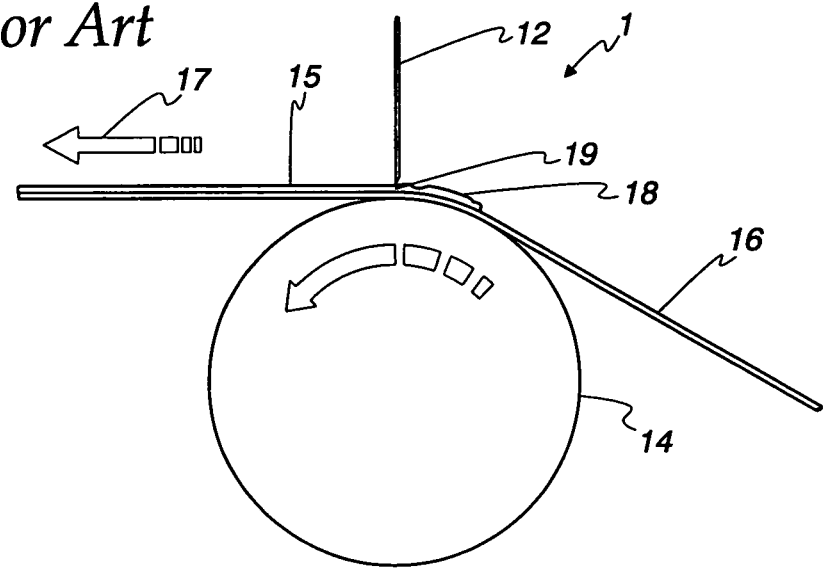
FIG. 1 is a side view of a prior art knife over roll coater.

A prior art knife over roll coater 1 is shown in FIG. 1. A knife 12 is above and adjacent to cylindrical roller 14 which revolves around counter clockwise to apply a liquid pigmented composition to a web 16 moving downstream in the direction 17 under knife 12. The liquid pigmented composition was gently poured onto the web behind the knife, as at 18. As the roller revolved in a counter clockwise direction, the liquid pigmented composition proceeded under the knife 12 and through the gap 19 between the knife and the web 16 on the roller. The liquid pigmented composition remained on the surface of the web, as at 15, and was moved to an oven downstream for later drying.

Figure 2:
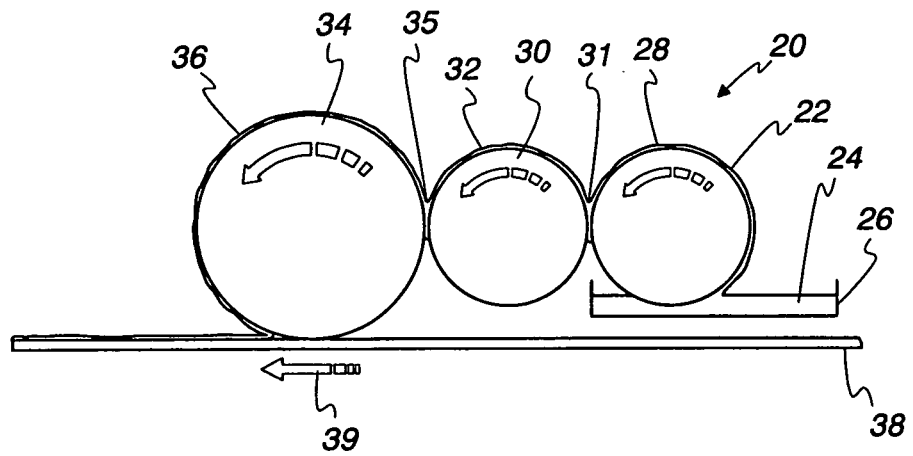
FIG. 2 is a side view of a prior art roller roller coater.

In another prior art method, a roller roller coater 20 has been used and is shown in FIG. 2. A liquid pigmented composition 24 in a reservoir 26 was applied to the surface of roller 22 as it revolved through the reservoir. The liquid pigmented composition 28 on the surface of roller 22 was applied to roller 30 as rollers 22 and 30 interfaced as they revolved around with their surfaces interfacing as at 31. The liquid pigmented composition was transferred from the surface of roller 22 to the surface of roller 30 and the liquid pigmented composition 32 on the surface of roller 30 was transferred to roller 34 at the interface 35 of roller 30 and 34 so that it was on the surface of roller 34 as at 36 and was applied to web 38 which was moving downstream as shown by arrow 37.

In either prior art method, it was not known to spray paint onto a web in a knife over roll coater or on roller 22 in a roller roller coater. Moreover, applying a color matched pigmented composition by either prior art method, did not achieve a special unique look as a manufacturer's metallic paint would look when sprayed onto a substrate surface by the paint user.

To solve the latter problem, some color card manufacturers have tried to spray metallic paint directly onto a substrate surface, such as paper, then clear coat the paper and then cut the clear coated painted paper into chips for application to a mount base. As noted above, this has not worked well on paper chips because paper inherently does not illustrate glossy paint very well. Second, spray painting a large substrate requires the nozzle to be set from the substrate a sufficient distance such that the paint will sufficiently coat and cover the substrate. This results in the loss of large amounts of atomized paint to the atmosphere and the loss and waste of paint. Further, clear coating created the necessity of extra materials and at least one more step in the form of the clear coating step in making the color display device.

The method and product described herein not only avoids the problems in the prior art and the waste of paint, but provides a color display product which uniquely displays metallic paint or special effect pigmented paint and more nearly emulates the way such paint appears when actually sprayed onto a substrate by an end user of the manufacturer's paint.

Figure 3:
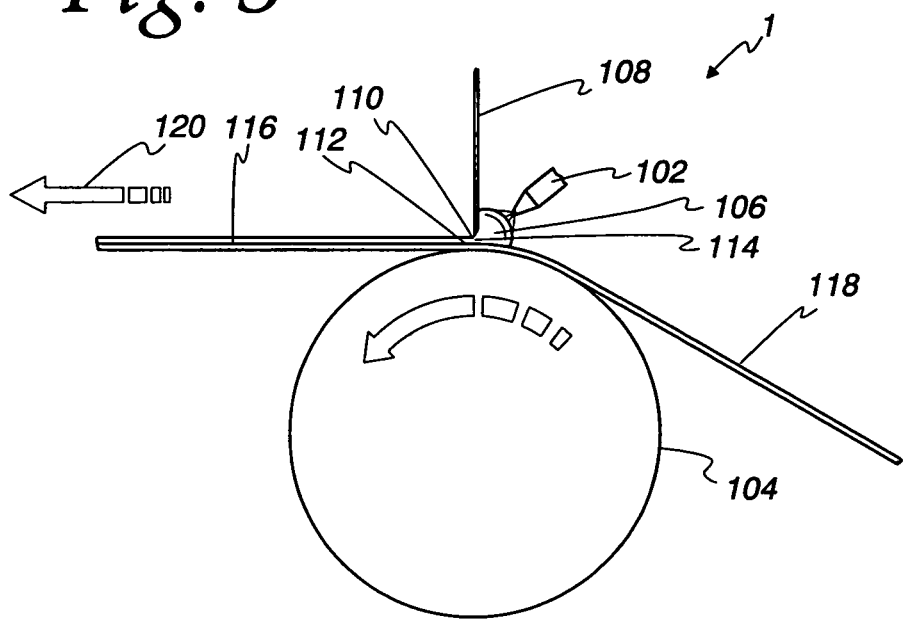
FIG. 3 is a side view of a spray transfer roller which include a knife over the roller coater.

According to the invention and as seen in FIG. 3, paint is sprayed from a nozzle 102, onto the web 118 which is on roller 104. The paint sprayed onto the web 118 forms a small reservoir 106 behind a knife 108 which is immediately above the web and roller 104. The bottom edge 110 of the knife 108 is separated from the surface 112 of the web and roller by gap 114. The gap is from $2/1000$ inch to $20/1000$ inch from the surface of the web. The paint is spread by the knife over the surface of the web on the roller. The roller revolves under the knife and moves the web downstream in the direction of 120. As the paint coated surface 116 of the web 118 moves downstream, as seen by arrow 120, in the gap between the knife and roller, paint is applied and spread onto the web/polymeric film. Thereafter the paint is dried, preferably by conveying the painted web into and through an oven having a temperature in the range of from about 190° F. to about 280° F.

Figure 4:
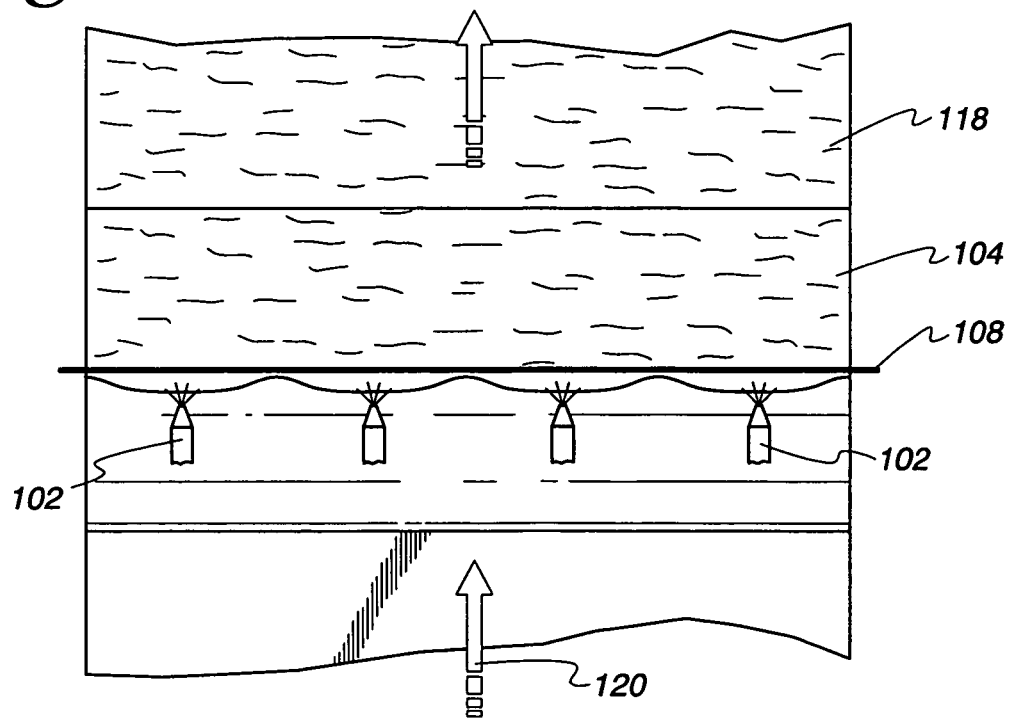
FIG. 4 is a top view of the spray transfer roller of FIG. 3.

As seen in FIG. 4, multiple spray nozzles 102 extend in the cross direction over the web 118 to spray paint onto the surface 112 of the web. The paint from the spray is spread by knife 108.

The nozzle atomizes the paint and applies with a low pressure spray gun at an air cap pressure (measuring exiting pressure at the cap on the nozzle) in the range of from about 2 psi to about 10 psi. Spray gun tip sizes range from about 0.7 mm to 2.2 mm in diameter. The spray nozzle is from about 7 cm to about 39 centimeters from the surface of the web to which paint is being applied. The paint is applied to the polymeric web at the rate of from about 8 fluid ounces to about 20 fluid ounces/minute.

The web for the chips or swatches is a polymeric film. In this aspect, two types of clear polymeric film which are useful are acrylic coated biaxially oriented polypropylene (commercially available from ExxonMobile Chemical Co) and polyethylene terephthalate film which is commercially available from Mitsubishi Chemical Company or from the Dupont Company under the name Mylar. The thickness of the biaxially oriented polypropylene and polyethylene terephthalate should be in the range of from about ½ mil (0.0005 inches) to about 0.10 inches.

After the paint has dried, the film is cut into chips or larger swatches for placement onto an adhesive coated surface. In this aspect, the paint on the surface of the film is dried, the paint coated film cut, and then the paint coated side of the film is placed on an adhesive which, in an important aspect, has been printed onto a mount base.

Figure 6:
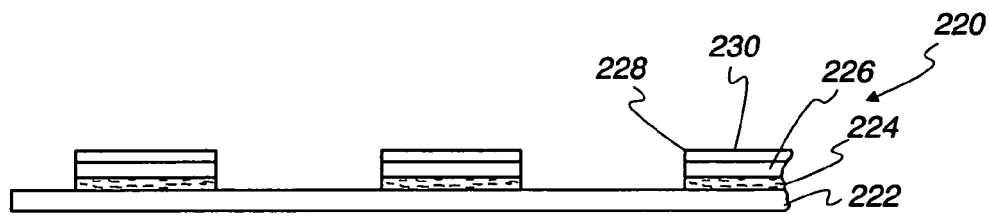
FIG. 6 is a side view of a color display device where paint on a clear film chip interfaces with an adhesive to adhesively attach the painted chip to a mount base.

As seen in FIG. 6, the color display device 220, has paint coated swatches adhesively affixed to a mount base 222 with an adhesive 224. The paint coating 226 on the film 228 is between the printed adhesive on the mount base and the clear film. The surface 230 of the clear film provides a clear gloss for the paint coating when a viewer of the color card views the paint color through the clear film. The clear film makes the paint appear to have been clear coated because the viewer looks at the color chip through the clear polymeric film.

Figure 5:
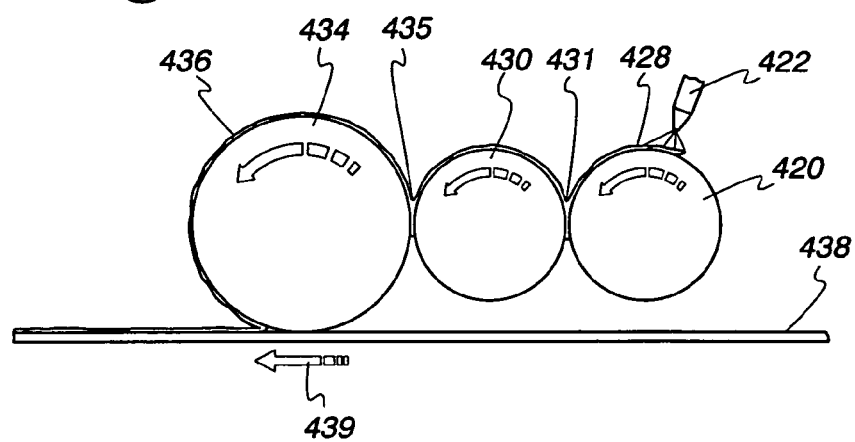
FIG. 5 is a side view of a spray transfer device which sprays paint onto a roller roller coater.

In another aspect and as seen in FIG. 5, the spray transfer of the metallic or special effect pigmented paint may be achieved with a roller roller application technique. In this aspect, a roller 420 is sprayed with metallic or special effect pigmented paint from a nozzle 422 to apply paint 428 onto the surface of roller 420. The type of nozzle and pressures used with the knife and roller are used in this aspect of the invention. As with the knife over roll coater and spray nozzle, in this aspect of the invention, the distance of the nozzle is from about 7 cm to about 39 centimeters from the surface of the roller to which paint is being applied. The paint is applied to the polymeric web from the roller at the rate of from about 8 fluid ounces to about 20 fluid ounces/minute. The polymeric web moves under the paint application roller at from 5 to about 100 lineal feet/minute on a roller having a diameter of about 9 inches. The spray coated roller then applies paint from its surface to a second roller 430 at an interface 431 between the two rollers. The second roller 430 then revolves and applies paint to a third roller 434 at the interface 435 between the second and third rollers. The paint 436 on the surface of the third roller then is applied to the surface of the polymeric web 438 moving in the downstream direction 439. The spray transfer technique using multiple rollers, such as three also may be applied using two rollers or more than three rollers.

What is claimed is:

1. A method for making a color display product which displays a special effect pigmented paint, the method comprising:
   providing a web of polymeric film having an unpainted surface which may be painted;
   spraying special effect pigmented paint onto the unpainted surface of the web of polymeric film which web of polymeric film is on the surface of an application roller, the paint being sprayed behind an application knife which includes an application knife blade spaced from the surface of the web of polymeric film and application roller, the spray creating a reservoir of paint behind the knife and between the knife and web surface;
   conveying the web of polymeric film under the application knife and between the knife and application roller;
   evenly distributing the special effect pigmented paint in the reservoir behind the application knife with the knife blade onto the unpainted surface of the web of polymeric film and provide special effect pigmented paint on the unpainted surface of the web downstream the knife;
   drying the special effect pigmented paint on the polymeric film surface to provide at least one dried paint coat on the surface of the web of polymeric film to provide a paint coated web;
   cutting the paint coated web into paint coated swatches; and
   adhesively affixing the dried paint coat on the polymeric surface to a mount base such that the dried paint coat is viewed through the polymeric film.

2. The method as recited in claim 1 wherein the special effect pigmented paint includes flakes which are effective for varying the appearance of the paint depending on the angle the paint is viewed when the paint is dry.

3. The method as recited in claim 2 wherein the special effect pigmented paint comprises from 1 to 10 weight percent flakes which range in size of from 1 to 100 microns.

4. The method as recited in claim 2 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

5. The method as recited in claim 4 wherein the spray nozzle has a diameter of from about 0.7 mm to 2.2 mm in diameter.

6. The method as recited in claim 2 wherein the web of polymeric film has a thickness in the range of from 0.0005 inches to about 0.10 inches and is selected from the group consisting of biaxially oriented polypropylene and polyethylene terephthalate.

7. The method as recited in claim 6 wherein the special effect pigmented paint comprises from 1 to 10 weight percent flakes which range in size of from 1 to 100 microns.

8. The method as recited in claim 7 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

9. The method as recited in claim 8 wherein the special effect pigmented paint is a metallic paint which includes metallic flakes.

10. A method for making a color display product which displays a special effect pigmented paint, the method comprising:
    providing a web of polymeric film having an unpainted surface which may be painted;
    spraying special effect pigmented paint onto the web of polymeric film which web is on the surface of an application roller, the paint comprising flakes selected from the group consisting of metallic flakes, glass flakes and mica flakes, the special effect pigmented paint comprising from 1 to 10 weight percent flakes which range in size of from 1 to 100 microns, the paint being sprayed behind an application knife which includes an application knife blade spaced from the surface of the web and application roller, the spray creating a reservoir of paint behind the knife and between the knife and web surface, the flakes effective for varying the appearance of the paint depending on the angle the paint is viewed when the paint is dry;

conveying the web of polymeric film under the application knife blade and between the knife and application roller;

evenly distributing the special effect pigmented paint in the reservoir behind the application knife with the knife blade onto the unpainted surface of the web of polymeric film and provide special effect pigmented paint on the unpainted surface of the web of polymeric film downstream the knife;

drying the special effect pigmented paint on the polymeric film surface to provide at least one dried paint coat on the polymeric film surface to provide a paint coated web;

cutting the paint coated web into paint coated swatches; and adhesively affixing the dried paint coat on the polymeric surface to a mount base such that the dried paint coat is viewed through the polymeric film.

11. The method as recited in claim 10 wherein the spraying of the paint includes atomizing the paint from a spray nozzle at an air cap pressure in the range of from about 2 psi to about 10 psi and the spray nozzle is from about 7 cm to about 39 centimeters from the surface of the web to which paint is being applied.

12. The method as recited in claim 11 wherein the spray nozzle has a diameter of from about 0.7 mm to 2.2 mm in diameter.

13. The method as recited in claim 11 wherein the polymeric film has a thickness in the range of from 0.0005 inches to about 0.10 inches and is selected from the group consisting of biaxially oriented polypropylene and polyethylene terephthalate.

14. The method as recited in claim 13 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

15. The method as recited in claim 14 wherein the special effect pigmented paint is a metallic paint which includes metallic flakes.

16. A method for making a color display product which displays a special effect pigmented paint, the method comprising:

providing a web of polymeric film having a surface which is unpainted and which may be painted, the film selected from the group consisting of biaxially oriented polypropylene and polyethylene terephthalate;

spraying special effect pigmented paint onto the web of polymeric film which web is on the surface of an application roller, the paint comprising flakes selected from the group consisting of metallic flakes, glass flakes and mica flakes, the flakes in the special effect pigmented paint comprising from 1 to 10 weight percent flakes which range in size of from 1 to 100 microns, the paint being sprayed behind an application knife which includes an application knife blade spaced from the surface of the web and application roller, the spray creating a reservoir of paint behind the knife and between the knife and web surface, the flakes effective for varying the appearance of the paint depending on the angle the paint is viewed when the paint is dry;

conveying the web of polymeric film under the application knife blade and between the knife and application roller;

evenly distributing the special effect pigmented paint in the reservoir behind the application knife with the knife blade onto the unpainted surface of the web of polymeric film and provide special effect pigmented paint on the unpainted surface of the web downstream the knife;

drying the special effect pigmented paint on the polymeric film surface to provide at least one dried paint coat on the polymeric film surface to provide a paint coated web;

cutting the paint coated web into paint coated swatches; and adhesively affixing the dried paint coat on the polymeric surface to a mount base such that the dried paint coat is viewed through the polymeric film.

17. The method as recited in claim 16 wherein the spraying of the paint includes atomizing the paint from a spray nozzle at an air cap pressure in the range of from about 2 psi to about 10 psi and the spray nozzle is from about 7 cm to about 39 centimeters from the surface of the web to which paint is being applied.

18. The method as recited in claim 17 wherein the spray nozzle has a diameter of from about 0.7 mm to 2.2 mm in diameter.

19. A method for making a color display product which displays a special effect pigmented paint, the method comprising:

moving from an upstream direction to a downstream direction an unpainted web of polymeric film to a paint application station consisting essentially of a paint sprayer, a knife which includes a knife blade, and an application roller which supports the web of film, the film selected from the group consisting of biaxially oriented polypropylene and polyethylene terephthalate;

applying special effect pigmented paint at the paint application station onto an unpainted surface of the web of polymeric film by paint application steps consisting essentially of:

spraying the special effect pigmented paint onto the unpainted surface of the web as the web moves downstream, the web being supported on the application roller, the paint being sprayed behind the knife blade spaced from the surface of the web of polymeric film and application roller, the spray creating a reservoir of special effect pigmented paint behind the knife between the knife and web surface;

conveying in the downstream direction the web of polymeric film under the application knife blade and between the knife and application roller, the reservoir behind and upstream the knife; and evenly distributing the special effect pigmented paint in the reservoir behind the application knife with the knife blade onto the unpainted surface of the web of polymeric film as the film web moves in the downstream direction to provide evenly distributed special effect pigmented paint on the unpainted surface of the web downstream the knife; and after evenly distributing the special effect paint, drying the special effect pigmented paint on the polymeric film surface to provide at least one dried paint coat on the surface of the web of polymeric film to provide a paint coated web;

cutting the paint coated web into paint coated swatches; and adhesively affixing the dried paint coat on the polymeric surface to a mount base such that the dried paint coat is viewed through the polymeric film.

20. The method as recited in claim 19 wherein the special effect pigmented paint includes flakes which are effective for varying the appearance of the paint depending on the angle the paint is viewed when the paint is dry.

21. The method as recited in claim 20 wherein the special effect pigmented paint comprises from 1 to 10 weight percent flakes which range in size of from 1 to 100 microns.

22. The method as recited in claim 20 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

23. The method as recited in claim 22 wherein the spray nozzle has a diameter of from about 0.7 mm to 2.2 mm in diameter.

24. The method as recited in claim 20 wherein the web of polymeric film has a thickness in the range of from 0.0005 inches to about 0.10 inches.

25. The method as recited in claim 24 wherein the special effect pigmented paint comprises from 1 to 10 weight percent flakes which range in size of from 1 to 100 microns.

26. The method as recited in claim 25 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

27. The method as recited in claim 26 wherein the special effect pigmented paint is a metallic paint which includes metallic flakes.

28. A method for making a color display product which displays a special effect pigmented paint, the method comprising:
   moving from an upstream direction to a downstream direction an unpainted web of polymeric film to a paint application station, the film selected from the group consisting of biaxially oriented polypropylene and polyethylene terephthalate;
   spraying special effect pigmented paint onto an unpainted surface of the web of polymeric film web as the web moves downstream, the web being supported on an application roller, the paint being sprayed behind an application knife which includes an application knife blade spaced from the surface of the web of polymeric film and the application roller which supports the film web, the spray creating a reservoir of special effect paint behind the knife and between the knife and web surface;
   conveying the web of polymeric film in the downstream direction under the application knife blade and between the knife and the application roller; and
   after spray coating behind the application knife and creating the reservoir of the special effect behind the knife blade, evenly distributing the special effect pigmented paint in the reservoir with the knife blade onto the unpainted surface of the web of polymeric film to provide evenly distributed special effect pigmented paint on the unpainted surface of the web downstream the knife without additional application of the special effect paint to the web after the spraying of the paint; and
   after evenly distributing the special effect paint, drying the special effect pigmented paint on the polymeric film surface to provide at least one dried paint coat on the surface of the web of polymeric film to provide a paint coated web;
   cutting the paint coated web into paint coated swatches; and
   adhesively affixing the dried paint coat on the polymeric surface to a mount base such that the dried paint coat is viewed through the polymeric film.

29. The method as recited in claim 28 wherein the special effect pigmented paint includes flakes which are effective for varying the appearance of the paint depending on the angle the paint is viewed when the paint is dry.

30. The method as recited in claim 29 wherein the special effect pigmented paint comprises from 1 to 10 weight percent flakes which range in size of from 1 to 100 microns.

31. The method as recited in claim 29 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

32. The method as recited in claim 31 wherein the spray nozzle has a diameter of from about 0.7 mm to 2.2 mm in diameter.

33. The method as recited in claim 29 wherein the web of polymeric film has a thickness in the range of from 0.0005 inches to about 0.10 inches.

34. The method as recited in claim 33 wherein the special effect pigmented paint comprises from 1 to 10 weight percent flakes which range in size of from 1 to 100 microns.

35. The method as recited in claim 34 wherein the spraying of the special effect pigmented paint includes atomizing the paint from a spray nozzle at an air cap pressure in the range of from about 2 psi to about 10 psi and the spray nozzle is from about 7 cm to about 39 centimeters from the surface of the web to which paint is being applied.

36. The method as recited in claim 35 wherein the special effect pigmented paint is a metallic paint which includes metallic flakes.

* * * * *